United States Patent [19]
Edler

[11] Patent Number: 5,498,862
[45] Date of Patent: Mar. 12, 1996

[54] SIDE SCANNING BAR CODE READER WITH VERTICAL AND HORIZONTAL SCAN PATTERNS

[75] Inventor: Peter A. Edler, Saratoga, Calif.

[73] Assignee: International Computers Limited, London, England

[21] Appl. No.: 228,676

[22] Filed: Apr. 18, 1994

Related U.S. Application Data

[63] Continuation-in-part of Ser. No. 57,542, May 6, 1993, abandoned.

[51] Int. Cl.$^6$ .................................................... G06K 7/10
[52] U.S. Cl. .......................................... 235/457; 235/467
[58] Field of Search .................................. 235/467, 457, 235/462, 470, 472; 359/15, 17

[56] References Cited

U.S. PATENT DOCUMENTS

| | | | |
|---|---|---|---|
| 4,591,236 | 5/1986 | Broockman et al. | 235/457 |
| 4,652,732 | 3/1987 | Nickl | 235/462 |
| 4,848,862 | 7/1989 | Yamazaki et al. | 359/17 |
| 5,026,975 | 6/1991 | Guber et al. | 235/462 |
| 5,073,702 | 12/1991 | Schuhmacher | 235/467 |
| 5,266,788 | 10/1993 | Yamazaki et al. | 235/467 |

FOREIGN PATENT DOCUMENTS

| | | | |
|---|---|---|---|
| 0073386 | 4/1987 | Japan | 235/462 |
| 3268188 | 11/1991 | Japan | 235/462 |

Primary Examiner—Donald T. Hajec
Assistant Examiner—Mark Tremblay
Attorney, Agent, or Firm—Lee, Mann, Smith, McWilliams, Sweeney & Ohlson

[57] ABSTRACT

An optical bar code scanner has a laser for generating a coherent light beam, and a multifaceted rotatable mirror for scanning the beam. The scanned beam is reflected from at least three fixed mirrors. Two of these mirrors reflect the beam horizontally through a window in the scanner housing. Another mirror reflects the beam upwards, through a hologram, within the housing. The hologram converts the horizontal scanning pattern of this upwardly-reflected beam into a vertical scan pattern, directed horizontally through the window.

7 Claims, 2 Drawing Sheets

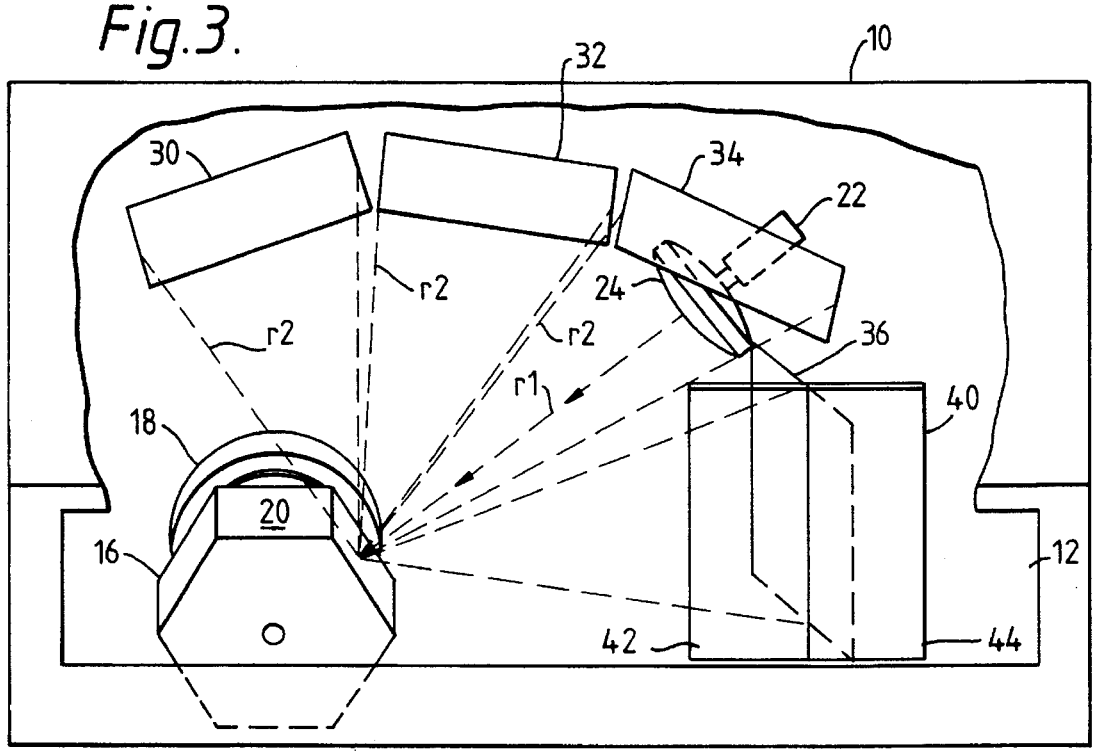
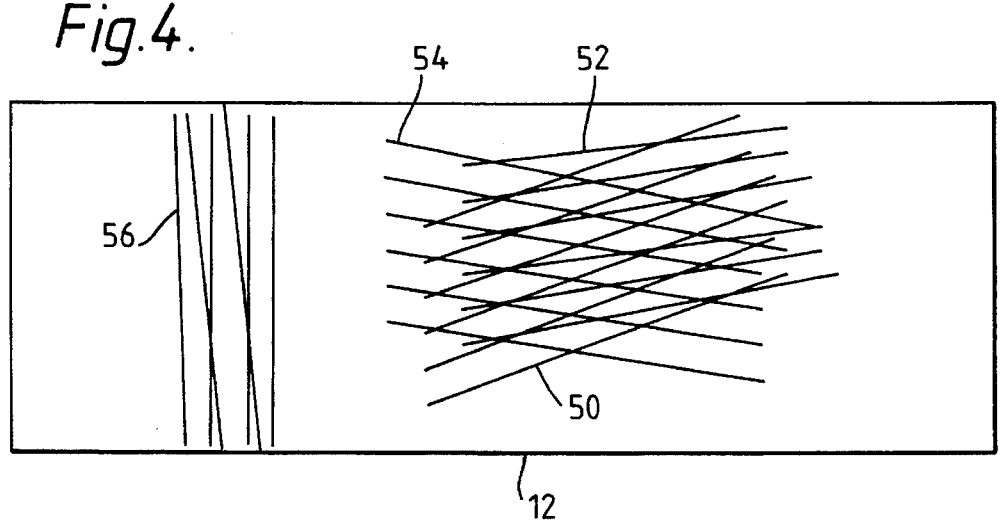

SIDE SCANNING BAR CODE READER WITH VERTICAL AND HORIZONTAL SCAN PATTERNS

CONTINUING DATA

This application is a continuation-in-part of application Ser. No. 08/057,542, filed May 6, 1993, now abandoned.

BACKGROUND OF THE INVENTION

This invention relates to optical bar code scanners for scanning bar code labels. Such scanners are typically used, for example, in retail check-out stations to read bar code labels on packages.

The invention is particularly concerned with optical bar code scanners of the type in which the scanning optics are positioned to the side of the scanning area, rather than being positioned below the scanning area. One such side scanner is described, for example, in U.S. Pat. No. 4,652,732.

In such a side scanner, it is known to produce at least three scanning light beams directed into the scanning area. Two of these beams are scanned in a generally horizontal direction and the other beam is scanned in a generally vertical direction.

A disadvantage of known side scanners is that they require complex optical systems, involving multiple mirrors for each set of beams, to produce the required combination of horizontal and vertical scans. The object of the present invention is to provide an improved optical scanner in which such a scan pattern is produced in a simpler manner than in conventional systems.

SUMMARY OF THE INVENTION

According to the invention there is provided an apparatus for scanning a bar code and providing an electrical signal indicative of the scanned bar code, comprising:

a housing having an optically transmissive window in a side wall of the housing, said window defining a scanning region horizontally adjacent to said window;

means mounted within said housing for generating first, second and third scan patterns each comprising a plurality of substantially parallel spaced apart light scan lines, wherein said first scan pattern scan lines each enter said scanning region through said window at planes each at a first predetermined angle from horizontal, said second scan pattern scan lines each enter said scanning region through said window at planes each at a second predetermined angle from horizontal, said third scan pattern scan lines each enter said scanning region through said window at planes each substantially vertical, and said third scan pattern scan lines each enter said scanning region substantially at one side of and substantially not between said first and second scan lines;

means for detecting light reflected back through said window from a bar code being scanned within said scanning region;

means for directing said reflected light from said bar code being scanned to said means for detecting light; and means for providing an electrical signal in response to said means for detecting light.

BRIEF DESCRIPTION OF THE DRAWINGS

FIG. 3 is partially cut-away top view of the scanner.

FIG. 4 shows the sets of scan patterns produced by the scanner.

DESCRIPTION OF AN EMBODIMENT OF THE INVENTION

An optical scanner in accordance with the invention will now be described by way of example with reference to the accompanying drawings.

Figure 1:
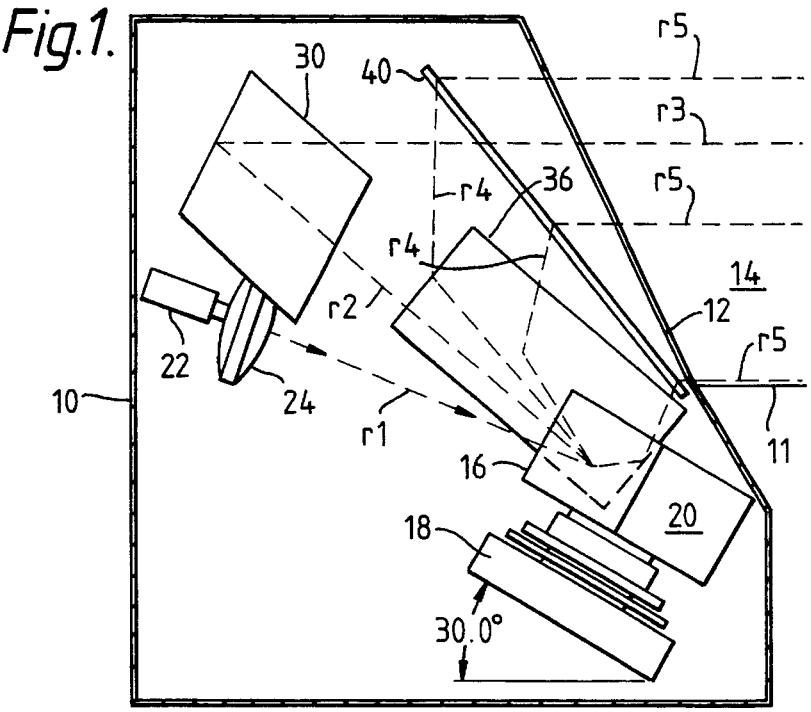
FIG. 1 is a sectional side view of an optical scanner in accordance with the invention.
Figure 2:
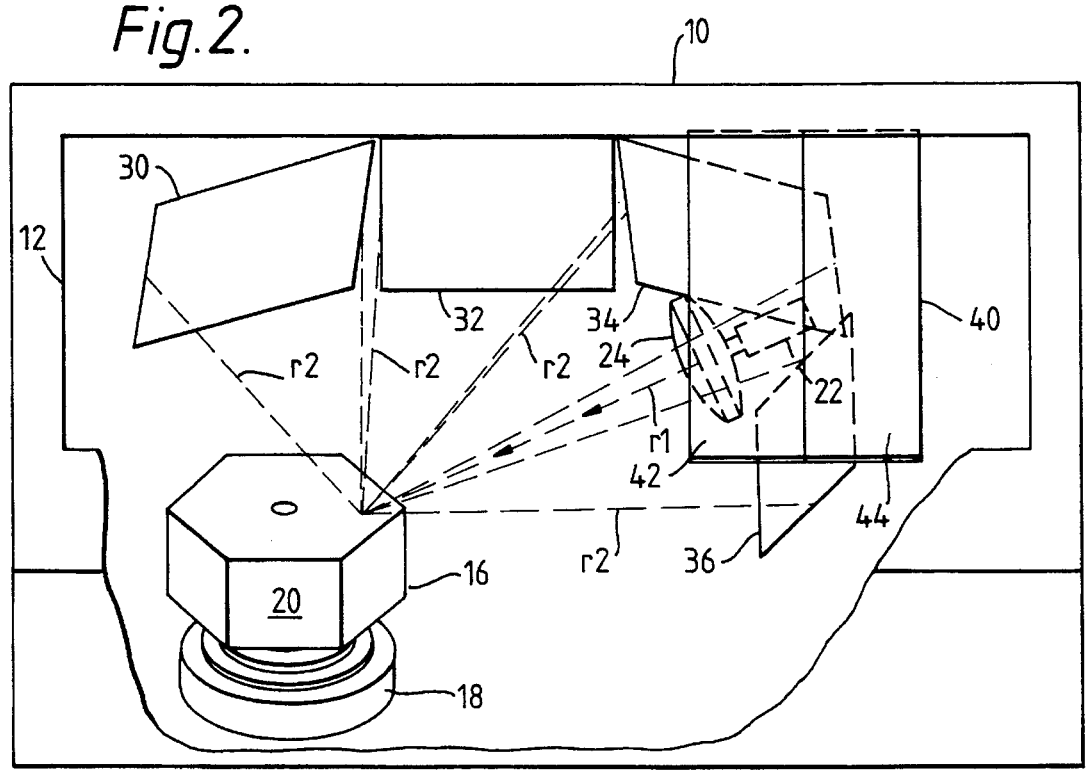
FIG. 2 is a partially cut-away front view of the scanner.

Referring to the FIGS. 1 to 3, the scanner comprises a housing 10 which holds the optical scanning and detection components for the scanner. In use, the housing is mounted in a checkstand counter surface 11. The housing 10 has an optically transparent window 12 at one side, inclined at approximately 65° to the horizontal. The window 12 faces a scanning zone 14 above the counter surface 11. As will be described, the scanner produces multiple scanning beams which pass through the window 12 to strike any objects in the scanning zone 14. Light scattered from the objects passes back through the window 12 and is detected by detection components of the scanner.

The optical scanning components comprise a six-sided prism 16 which in operation is rotated about its axis by means of an electric motor 18. The axis of the prism is inclined at 30° to the vertical. The six outer faces 20 of the prism are mirrored. Each of the faces is inclined at a different angle to the axis of the prism.

A laser diode 22 produces a beam r1 which passes undeflected through a hole in the centre of a collection lens (or mirror) 24, and hits one of the mirrored faces 20 of the prism to produce a reflected beam r2. As the prism rotates, the reflected beam r2 scans across each of four fixed mirrors 30, 32, 34, 36 in turn. Because the six mirrored faces of the prism 20 are at different angles, it can be seen that the beams reflected from each fixed mirror follow a scan pattern comprising a set of six parallel scan lines during each revolution of the prism 16.

The first three fixed mirrors 30, 32, 34 are angled such that the reflected beams r3 from these mirrors pass through the window 12 into the scanning zone 14 in a generally horizontal direction.

The fourth fixed mirror 36 is angled so as to produce a set of reflected beams r4 in an upward direction, into a hologram window 40 positioned under the window 12 and inclined at approximately 55° to the horizontal.

It can be seen that the beams r4 strike the hologram window 40 at varying angles along the path of each scan.

The hologram window 40 acts as a diffractive lens to deflect the beam r4 to produce a set of beams r5 directed into the scanning zone 14. The hologram is designed to deflect the beams by varying amounts along its length, so that the beams r5 are all substantially horizontal.

The hologram window 40 consists of two halves: a left half 42 and a right half 44. The left half 42 is designed to diffract the beams approximately 15° to the right, while the right half 44 diffracts the beams approximately 15° to the left.

Referring now to FIG. 4, this shows the resultant scan patterns of the beams in a vertical plane as they exit the window 12 and enter the scanning zone 14, as viewed from the scanner 10. The scan patterns consist of four sets of six scan lines, as follows:

1) Six substantially horizontal scan lines 54, produced by the beam r3 reflected from the mirror 30. As shown, each of these scan lines 54 is inclined at a small angle preferably in the range 5° to 35° relative to the horizontal.
2) Six substantially horizontal scan lines 50, produced by the beam r3 reflected from the mirror 34. Each of these scan lines is inclined at a small angle preferably in the range 5° to 35° relative to the horizontal.
3) Six substantially vertical scan lines 56, produced by the beam r5 reflected from the mirror 36, after passing through the hologram 40. Three of these scan lines are inclined at approximately 15° down to the right relative to the vertical, and the other three are inclined at approximately 15° down to the left relative to the vertical.
4) Six substantially horizontal scan lines 52, produced by the beam r3 reflected from the mirror 32. Each of these scan lines is inclined at a small angle preferably in the range minus 25° to plus 25° relative to the horizontal.

It should be noted that the substantially horizontal sets of scan lines 50, 52, 54 all overlap each other, but the substantially vertical scan lines 56 enter the scanning zone to one side of the substantially horizontal sets of scan lines 50, 52, 54. It has been found that this arrangement in which vertical scan lines are juxtaposed to one side of the horizontal scan lines is more efficient than conventional arrangements in which vertical scan lines overlap horizontal scan lines.

Light scattered from objects in the scanning zone passes back through the window, along the reverse optical path, to the collector lens 24 (or mirror), which focuses the light on to an optical detector (not shown).

In a modified form of the scanner described above, the mirrors 30 and 34 are turned towards each other more compared with FIGS. 1–3, so that each scan pattern passes through the hologram 40 (now modified to be larger and to cover most of the window 12) and is diffracted by it. The hologram 40 is designed to diffract the beams back towards the centre line.

It will be appreciated that the bar code scanner described above is merely an example and that many modifications may be made without departing from the scope of the invention as defined in the following claims.

I claim:

1. An apparatus for scanning a bar code and providing an electrical signal indicative of the scanned bar code, comprising:
   (a) a housing having an optically transmissive window in a side wall of the housing, said window defining a scanning region horizontally adjacent to said window;
   (b) means mounted within said housing for generating a coherent beam of light;
   (c) first redirection means mounted within said housing for redirecting said coherent beam of light into a plurality of substantially parallel spaced apart scanning beams of light;
   (d) second redirection means, comprising a single mirror mounted within said housing, for redirecting a first portion of each of said scanning beams of light for generating a first scan pattern comprising a plurality of substantially parallel spaced apart light scan lines, wherein said first scan pattern scan lines each enter said scanning region through said window at planes each at a first predetermined angle from horizontal;
   (e) third redirection means, comprising a single mirror mounted within said housing, for redirecting a second portion of each of said scanning beams of light for generating a second scan pattern comprising a plurality of substantially parallel spaced apart light scan lines, wherein said second scan pattern scan lines each enter said scanning region through said window at planes each at a second predetermined angle from horizontal;
   (f) fourth redirection means, comprising a single mirror and a holographic optical element mounted within said housing, for redirecting a third portion of each of said scanning beams of light for generating a third scan pattern comprising a plurality of substantially parallel spaced apart light scan lines, wherein said third scan pattern scan lines each enter said scanning region through said window at planes each substantially vertical, and said third scan pattern scan lines each enter said scanning region substantially at one side of and substantially not between said first and second scan lines;
   (g) means for detecting light reflected back through said window from a bar code being scanned within said scanning region;
   (h) means for directing said reflected light from said bar code being scanned to said means for detecting light; and
   (i) means for providing an electrical signal in response to said means for detecting light.

2. The apparatus of claim 1 wherein said first and second predetermined angles are in a range of 5 degrees to 35 degrees.

3. The apparatus of claim 1 wherein said means for generating a coherent beam of light is an optical laser.

4. The apparatus of claim 3 wherein said optical laser is a visible laser diode.

5. The apparatus of claim 1 wherein said means for redirecting said coherent beam of light into a plurality of substantially parallel spaced apart scanning beams of light comprises:
   (a) a polygon-shaped spinner within said housing, said spinner having a plurality of reflecting surfaces thereon, each surface positioned at a different angle with respect to a common axis;
   (b) means mounted within said housing for rotating said spinner at a predetermined rate;
   (c) means mounted within said housing for directing said coherent beam of light to hit each reflective surface of said spinner, one at a time as said spinner is rotated.

6. The apparatus of claim 1 wherein said plurality of substantially parallel spaced apart scanning beams of light lie substantially in a plane at a predetermined angle from horizontal, in a range of 5 degrees to 35 degrees so as to ascend upwardly away from said scanning region.

7. The apparatus of claim 1 wherein said holographic optical element is divided along a line parallel to said third scan pattern scan lines, into at least two different portions.

* * * * *